United States Patent [19]

Bomberger, Jr. et al.

[11] E Re. 29,946

[45] Reissued Mar. 27, 1979

[54] TITANIUM-BASE ALLOY AND METHOD OF IMPROVING CREEP PROPERTIES

[75] Inventors: Howard B. Bomberger, Jr., Canfield; Stanley R. Seagle, Warren, both of Ohio

[73] Assignee: RMI Company, Niles, Ohio

[21] Appl. No.: 812,881

[22] Filed: Jul. 5, 1977

Related U.S. Patent Documents

Reissue of:

[64] Patent No.: 3,833,363
Issued: Sep. 3, 1974
Appl. No.: 241,286
Filed: Apr. 5, 1972

[51] Int. Cl.[2] ..... C22C 14/00; C22F 1/18

[52] U.S. Cl. ..... 148/11.5 F; 75/175.5; 148/32; 148/133

[58] Field of Search ..... 148/11.5 F, 325, 133, 148/32, 133; 75/175.5

[56] References Cited

U.S. PATENT DOCUMENTS

| | | | |
|---|---|---|---|
| 2,893,864 | 7/1959 | Harris et al. | 75/175.5 |
| 3,049,425 | 8/1962 | Fentiman et al. | 75/175.5 |
| 3,343,951 | 9/1967 | Peebles | 75/175.5 |
| 3,378,368 | 4/1968 | Minton et al. | 75/175.5 |
| 3,482,968 | 12/1969 | Hunter | 75/175.5 |
| 3,619,184 | 11/1971 | Bomberger et al. | 75/175.5 |
| 3,756,810 | 9/1973 | Parris et al. | 75/175.5 |

FOREIGN PATENT DOCUMENTS 1156397 6/1969 United Kingdom.

OTHER PUBLICATIONS

AFML-TR-70-125, Development of a 900° F. Titanium Alloy, Russo et al., Jul. 1970, pp. 5-33 & 84-89.

*Primary Examiner*—W. Stallard
*Attorney, Agent, or Firm*—Forest C. Sexton

[57] ABSTRACT

A titanium-base alloy consisting by weight of about 5.5 to 6.5% aluminum, 1.7 to 2.3% tin, 0.7 to 5.0% zirconium, 0.7 to 3.0% molybdenum, 0.04 to 0.13% silicon, and the balance titanium. The addition of silicon to the otherwise known alloy produces a marked improvement in creep properties without significant detrimental effect to other properties.

6 Claims, 3 Drawing Figures

EFFECT OF SILICON CONTENT ON THE CREEP PROPERTIES OF Ti - 6242 MODIFICATIONS

EFFECT OF SILICON CONTENT ON THE NOTCH TOUGHNESS OF Ti - 6242 MODIFICATIONS

EFFECT OF SILICON ON THE CREEP DEFORMATION OF Ti - 6242 MODIFICATIONS AFTER 950F FOR 100 HOURS AT 35 KSI

TITANIUM-BASE ALLOY AND METHOD OF IMPROVING CREEP PROPERTIES

Matter enclosed in heavy brackets [ ] appears in the original patent but forms no part of this reissue specification; matter printed in italics indicates the additions made by reissue.

This invention relates to a titanium-base alloy which has improved creep properties compared with alloys most similar to it in composition, and to a method of improving the creep properties of an otherwise known titanium-base alloy.

Our alloy may be looked on as an improvement over the alloys described in Harris et al U.S. Pat. No. 2,893,864 and Peebles U.S. Pat. No. 3,343,951, particularly the latter. Peebles describes a titanium-base alloy which consists by weight of 5.5 to 6.5% aluminum, 1.7 to 2.3% tin, 0.7 to 5.0% zirconium, and 0.7 3.03.0% molybdenum, balance titanium and unavoidable impurities. The only other elements discussed in the patent specification as being present in the alloy are oxygen, nitrogen and carbon, the last two as interstitial impurities. Silicon is not discussed, but information available in the file history establishes that the patentee believed he should exclude silicon altogether from the alloy for the reason that as little as 0.15% silicon has a highly detrimental effect on notch toughness. In fact the patentee pointedly says silicon or equivalent compound-forming elements must be omitted from his alloys. Alloys of compositions within the range described in the Peebles patent have many useful properties and have achieved commercial success. The most common such alloy contains normally 6% aluminum, 2% tin, 4% zirconium and 2% molybdenum, and is known in the trade as the "6242" alloy. Harris et al disclose a number of alloys of composition approaching the 6242 alloy, except that the alloys preferably contain about 0.1 to 2.0% silicon. Most of the alloys listed in the examples in the patent have a silicon content of 0.5%. The apparent purpose of the patentees is to provide alloys which have improved creep properties; the patent does not discuss notch toughness.

Heretofore there have been available (a) 6242 alloy to which no silicon is added intentionally, and (b) an alloy otherwise similar to 6242 to which silicon is added in an amount to produce a silicon content of 0.2%. Only the former is presently used commercially, since the latter showed unfavorable notch toughness properties. We have observed that the commercial 6242 alloy usually has a residual silicon content in the range of about 0.02 to 0.03%, even though no silicon is added intentionally. Some of the residual silicon comes from the sponge titanium, but more is likely to come from the master alloy used to introduce molybdenum to the sponge. Modern spectrographic techniques can determine silicon contents in this range in the titanium-base alloys to an accuracy of about ±20 parts per million.

An object of our invention is to provide a novel titanium-base alloy which contains alloying elements in a range similar to that described in the Peebles patent, but to which we add silicon in an amount to produce a silicon content in a narrow critical range above the residual level, whereby our alloy exhibits marked improvement over the 6242 alloy in tests for creep properties and stress rupture strength at elevated temperatures, without appreciable detriment to its other properties such as tensile strength, ductility or notch toughness.

A further object is to provide a method of improving the creep properties of an alloy otherwise similar to the Peebles alloy by adding silicon to the alloy in an amount to produce a silicon content in a narrow critical range above the residual level but below the range used in the prior art.

Figure 2:
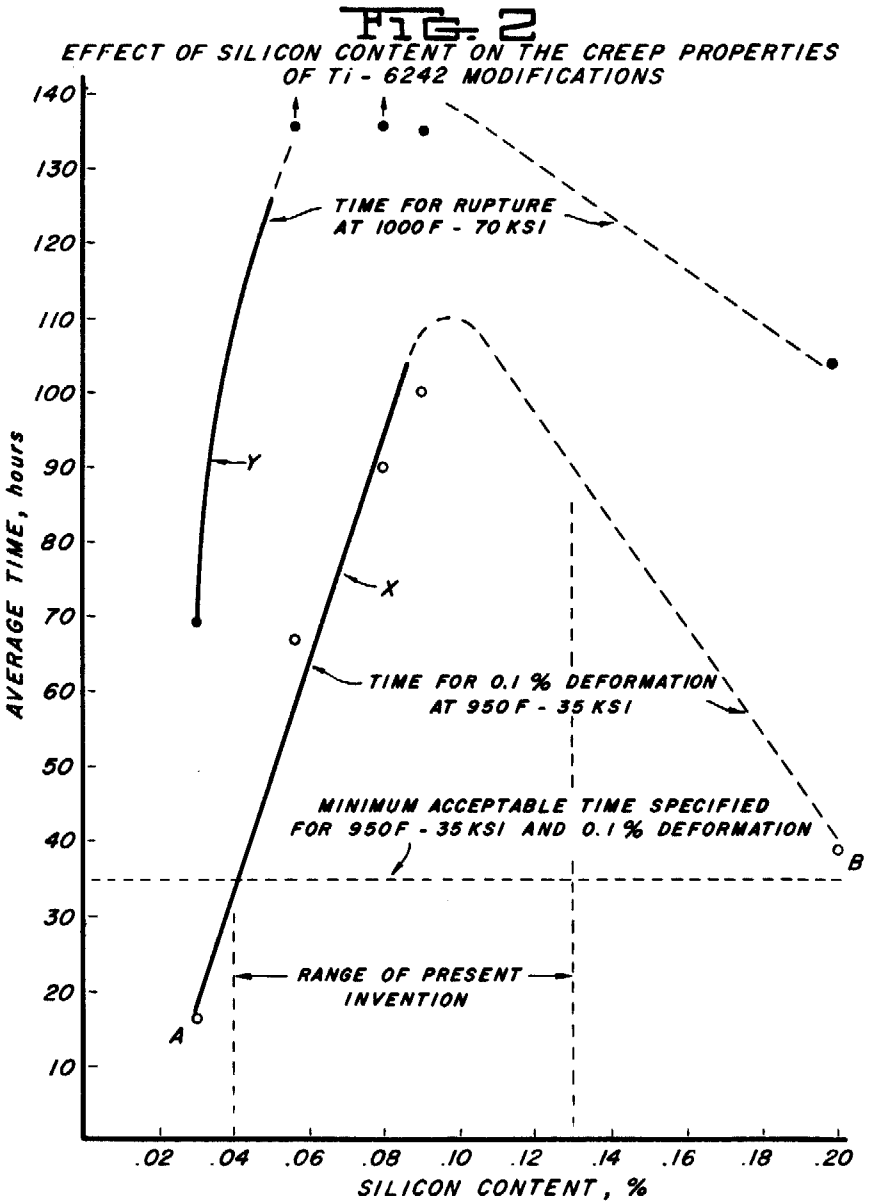
FIG. 2 is a graph showing the effect of silicon additions on the creep and stress rupture strengths of an alloy otherwise similar to the 6242 alloy.

According to our invention, we formulate alloys of a composition within the range of the Peebles patent and we can employ similar techniques, except that we add silicon to the alloy in an amount sufficient to produce a silicon content therein in a critical range of about 0.04 to 0.13% by weight, including the residual. Like Peebles, the remainder of the alloy consists by weight of about 5.5 to 6.5% aluminum, 1.7 to 2.3% tin, 0.7 to 5.0% zirconium, and 0.7 to 3.0% molybdenum, balance titanium and unavoidable impurities. The preferred nominal analysis apart from silicon is similar to the commercial 6242 alloy, to wit 6% aluminum, 2% tin, 4% zirconium and 2% molybdenum, balance titanium.

The creep properties of the alloy fall off significantly as the silicon content is lowered nearer the residual level of 0.03%. The upper limit of silicon in our alloy is defined by the level at which various properties, particularly notch toughness but surprisingly also creep, start to be affected detrimentally to an unacceptable degree. Our tests show that the creep strength is maximum at a silicon content just below our upper limit, but the optimum slicon content of our alloy for a good combination of properties is about 0.08 to 0.09%. To demonstrate these phenomena, we performed a series of tests hereinafter described.

COMPOSITION AND PREPARATION OF SPECIMENS

To conduct these tests, we formulated several 25-pound ingots of a composition within the range of the Peebles patent, except that we added silicon in varying amounts. Table I, which follows, lists the analyses of these ingots. Heat No. 20039 is actually the commercial 6242 alloy with its residual silicon content of 0.03% and is outside the lower limit of our invention. The constituents other than silicon fall within current commercial specifications for the 6242 alloy in all the Heats except No. 21006, which is low in molybdenum.

TABLE I

CHEMICAL COMPOSITION OF Ti-6242 MODIFICATIONS

| Heat No. | | Composition, % | | | | | | | | |
|---|---|---|---|---|---|---|---|---|---|---|
| | | Al | Sn | Zr | Mo | Fe | O | N | C | Si |
| 20039 | | 5.9 | 2.0 | 4.0 | 1.90 | .04 | .100 | .008 | .01 | .030 |
| 21004 | | 6.0 | 2.0 | 4.0 | 1.85 | .04 | .075 | .006 | .02 | .056 |
| 20043 | | 6.1 | 2.0 | 4.0 | 1.85 | .05 | .103 | .010 | .02 | .080 |
| 21005 | | 6.1 | 2.1 | 3.8 | 2.00 | .04 | .090 | .007 | .01 | .090 |
| 27277 | | 6.0 | 2.1 | 3.9 | 2.00 | .05 | .089 | .006 | .02 | .200 |
| 21006 | | 6.2 | 2.1 | 4.2 | 1.50 | .04 | .088 | .007 | .01 | .090 |
| Spec 1(1) | Max | 6.5 | 2.25 | 4.5 | 2.20 | .25 | .15 | .04 | .04 | (3) |
| | Min | 5.5 | 1.75 | 3.5 | 1.80 | | | | | |

Table II

TENSILE AND NOTCH TOUGHNESS PROPERTIES OF Ti-6242 MODIFICATIONS

| Heat[1] No. | Si % | −40° F[2] impact energy ft-lbs | 72° F UTS Ksi | 72° F YS Ksi | 72° F El % | 72° F RA % | 900° F UTS Ksi | 900° F YS Ksi | 900° F El % | 900° F RA % |
|---|---|---|---|---|---|---|---|---|---|---|
| 20039 | .030 | 16.18 | 162 | 150 | 16.5 | 45.0 | 119 | 91 | 19.5 | 49.5 |
| 21004 | .056 | | 164 | 151 | 15.0 | 40.3 | 117 | 93 | 16.0 | 43.5 |
| 20043 | .080 | 12.13 | 167 | 152 | 14.0 | 35.5 | 122 | 95 | 16.0 | 42.6 |
| 21005 | .090 | 13.11 | 163 | 147 | 16.0 | 40.1 | 123 | 95 | 15.0 | 38.8 |
| 27277 | .200 | 8.8 | 167 | 154 | 12.5 | 33.9 | 121 | 95 | 15.5 | 36.0 |
| 21006 | .090[3] | | 160 | 148 | 15.0 | 40.5 | 118 | 92 | 17.5 | 46.7 |

[1]5/8-inch bar. Heat treatment: (Beta transus −25° F)-1 hr-AC; 1100° F-8 hr-AC
[2]Standard ASTM Charpy V-Notch test
[3]Low Molybdenum (1.5%)

TABLE I-continued

CHEMICAL COMPOSITION OF Ti-6242 MODIFICATIONS

| Heat No. | | Composition, % Al | Sn | Zr | Mo | Fe | O | N | C | Si |
|---|---|---|---|---|---|---|---|---|---|---|
| Spec 2[2] | Max | 6.5 | 2.20 | 4.4 | 2.20 | .25 | .15 | .05 | .05 | (3) |
| | Min | 5.5 | 1.80 | 3.6 | 1.80 | | | | | |

[1]Pratt & Whitney Specification 1209D (February 15, 1971)
[2]General Electric Specifcation C50TF39-1T (March 18, 1971)[3]None Specified We conditioned the cast ingots, heated them in a 2,100° F. furnace and forged 2-inch squares. We reheated the squares in a 1,750° F. furnace and forged 1-inch rounds therefrom. We alpha-beta-rolled the 1-inch rounds from a 1,725° F. furnace to ⅝-inch diameter bars. We alpha-beta-annealed test specimens of these bars at temperatures about 25° F. below the beta transus for 1 hour and air-cooled them. We stabilized the specimens at 1,100° F. for 8 hours and air-cooled them.

TENSILE AND NOTCH TOUGHNESS TESTS

We conducted tensile tests on 0.250-inch gauge diameter machined specimens obtained from the bars described, both at room temperature and 900° F. We tested each specimen at 0.005 in./in./min. through the yield strength and thereafter at a crosshead speed of 0.2 in./min. until failure. We conducted notch toughness tests using the standard ASTM V-notch Charpy test at −40° F. Values of 10 ft.-lbs. or greater in the V-notch Charpy test are generally considered acceptable for titanium-base alloys. Table II, which follows, lists the results of the tensile and notch toughness tests.

As Table II shows, addition of silicon produces a modest increase in the yield strength of the alloy and a correspondingly small but acceptable loss in ductility. The notch toughness, as measured by impact energy, decreases as more silicon is added, but does not decrease below an acceptable value as long as the silicon content remains within the critical limits of our invention. While our invention results in a minor loss in notch toughness, it achieves a major gain in needed creep strength, as hereinafter demonstrated.

Figure 1:
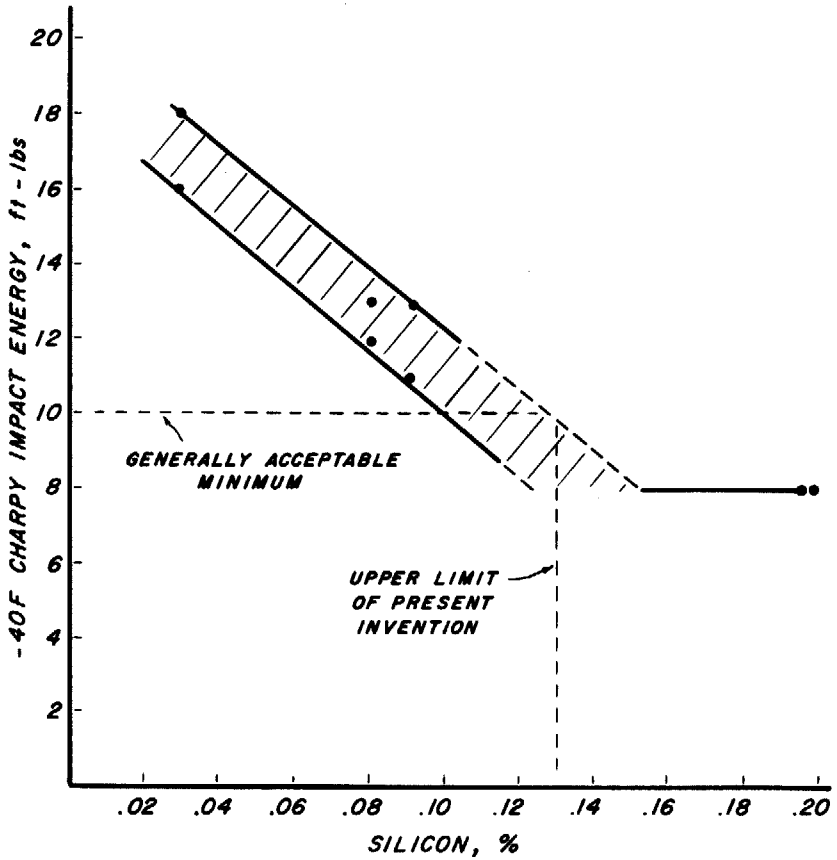
FIG. 1 is a graph showing the effect of silicon additions on the notch toughness of an alloy otherwise similar to the 6242 alloy.

FIG. 1 shows graphically the effect of silicon on notch toughness. As long as the silicon content of the alloy does not exceed our upper limit of about 0.13%, the Charpy impact energy is not likely to drop below the generally acceptable minimum of 10 ft.-lbs.

CREEP AND STRESS RUPTURE TESTS

We conducted creep tests on the specimens by exposing them to a stress of 35 Ksi at 950° F. We recorded both the time at which each specimen reached 0.1% deformation and the extent of deformation after 100 hours. We used an optical extensometer system to measure the deformation. We also conducted tensile tests on the specimens following creep exposure. Table III, which follows, lists the results.

Table III

CREEP PROPERTIES OF ROLLED ⅝-INCH BAR OF Ti-6242 MODIFICATIONS

| Heat[2] No. | Si % | Creep Results[1] Total Time hr. | Time for 0.1% | Total def % | Def at 100 hr % | Tensile Properties at 72° F UTS Ksi | YS Ksi | El % | RA % |
|---|---|---|---|---|---|---|---|---|---|
| 20039 | .030 | | No Exposure | | | 162 | 150 | 16.5 | 45.0 |
| | | 114 | 18 | .21 | .19 | 163 | 148 | 17.0 | 40.3 |
| | | 115 | 14 | .19 | .18 | 163 | 148 | 17.0 | 42.9 |
| 21004 | .056 | | No Exposure | | | 164 | 151 | 15.0 | 40.3 |
| | | 99 | 25 | .16 | .16 | 166 | 151 | 16.0 | 36.1 |
| | | 98 | 140 | .08 | .08 | 171 | 155 | 16.5 | 35.0 |
| | | 91 | .37 | .12 | .12 | 162 | 146 | 15.0 | 34.8 |
| 20043 | .080 | | No Exposure | | | 167 | 152 | 14.0 | 35.5 |
| | | 98 | 60 | .12 | .12 | 170 | 155 | 16.5 | 34.3 |
| | | 91 | 120 | .09 | .09 | 172 | 152 | 15.0 | 32.9 |
| 21005 | .090 | | No Exposure | | | 163 | 147 | 16.0 | 40.1 |
| | | 100 | 44 | .13 | .13 | 164 | 151 | 17.5 | 39.1 |
| | | 103 | >200 | .06 | .05 | 161 | 141 | 10.0 | 15.5 |
| 27277 | .200 | | No Exposure | | | 167 | 154 | 12.5 | 33.9 |
| | | 107 | 43 | .15 | .14 | 170 | 159 | 15.0 | 24.6 |
| | | 108 | 35 | .13 | .13 | 168 | 156 | 15.0 | 30.8 |

[1]950° F - 35 Ksi
[2]Heat Treatment (beta trasus −25° F)-1 hr-AC: 1100° F-8 hr-AC We conducted stress-rupture tests on the specimens at 1,000° F. using stresses of 70 Ksi and 75 Ksi. Table IV, which follows, lists the results.

Table IV

EFFECT OF SILICON ADDITIONS ON STRESS-RUPTURE 22 Ti-6242 MODIFICATIONS AT 1000° F

| Heat[4] No. | Si % | 70 Ksi Rupture Time hr. | 70 Ksi El % | 75 Ksi Rupture Time hr. | 75 Ksi El % |
|---|---|---|---|---|---|
| 20039 | .030 | 69 | 25 | 55 | (3) |
| 21004 | .056 | >281[1] | 26 | 110 | (3) |
| 20043 | .080 | >282[2] | 23 | 110 | (3) |
| 21005 | .090 | 135 | 25 | 114 | 29 |
| 27277 | .20 | 104 | 35 | 77 | 41 |

[1] load increased to 75 Ksi at 281 hrs and failure occurred after a combined time of 387 hrs.
[2] load increased to 75 Ksi at 282 hours and failure occurred after a combined time of 342 hrs.
[3] elongated to the limits of the stress-rupture machine
[4] ½-inch bar. Heat treatment: (Beta transus −25° F)-1 hr-AC; 1100° F-8 hr-AC.

Figure 3:
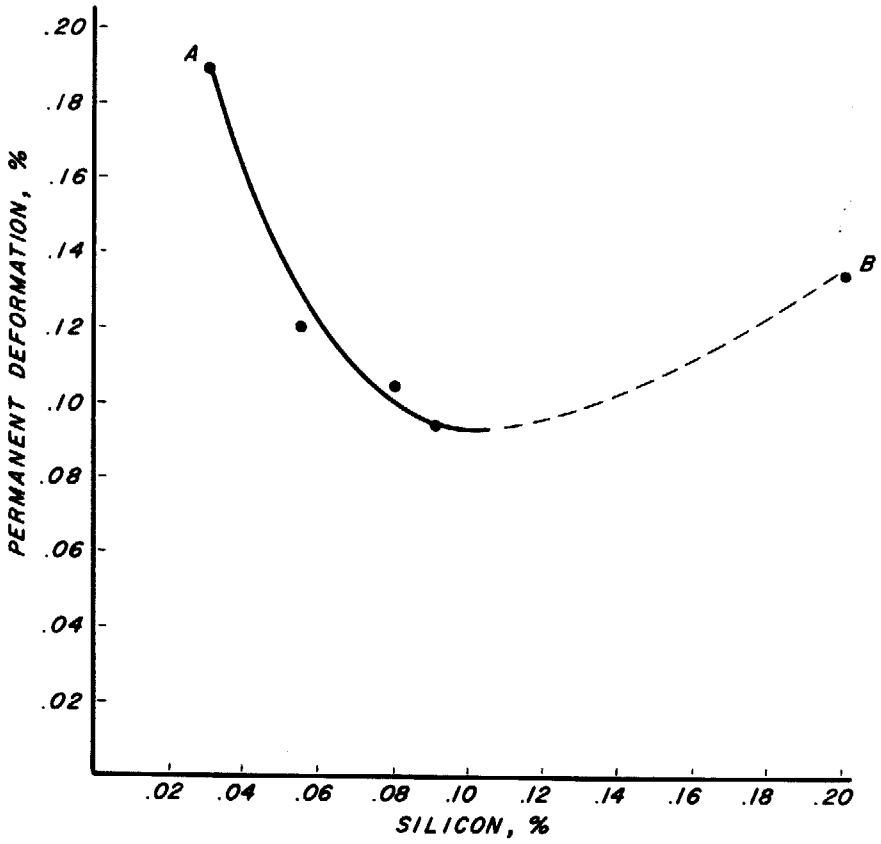
FIG. 3 is a graph showing the effect of silicon additions on the creep deformation of an alloy otherwise similar to the 6242 alloy.

FIG. 2 shows graphically results listed in Tables III and IV. In curve X we plot the average time to reach 0.1% deformation against silicon content. This curve shows a well-defined peak in the creep strength when the alloy has a silicon content of about 0.10%, but we prefer a slightly lower silicon content because other properties commence to be affected adversely at 0.10% silicon. Each point on the curve represents the average of at least two tests. The minimum acceptable time for 0.1% deformation under one current specification is 35 hours. The 6242 alloy, with only its residual silicon content, did not meet this specification, as indicated by point A on curve X. The alloy with a silicon content of 0.2% barely met this specification, as indicated by point B on the curve, but was deficient in other respects, as shown by the results of our notch toughness tests. Curve Y, in which we plot the time for rupture at 1,000° F. against silicon content, rises above the scale of the graph at our optimum silicon content, but thereafter drops precipitously. FIG. 3 shows graphically additional information from Table III on the effect of silicon on creep deformation. This curve, in which we plot the permanent deformation at 100 hours against the silicon content, shows a minimum again near our optimum silicon content. The points A and B in FIG. 3 correspond with the same points in FIG. 2.

The foregoing results were altogether unexpected to us. Our expectation had been that the relation between the time to reach 0.1% deformation and the silicon content would follow approximately a straight line between points A and B of FIG. 2 instead of reaching an intermediate peak. Thus our invention provides an alloy of dramatically improved creep strength compared with either the 6242 alloy or an otherwise similar alloy containing 0.2 percent silicon known previously. We maintain an acceptable level of notch toughness, but we trade a little in this respect for a much needed increase in creep strength.

We claim:

1. A titanium-base [alloy] *product* consisting by weight of about 5.5 to 6.5% aluminum, 1.7 to 2.3% tin, 0.7 to 5.0% zirconium, 0.7 to 3.0% molybdenum, silicon in an amount of at least 0.04% but less than 0.10%, and the balance titanium and unavoidable impurities, said [alloy] *product* having *as a major portion an alpha-beta worked structure and* a minimum Charpy V-notch impact energy of 10 ft.-lbs. *at −40° F.*, and requiring a minimum time of 35 hours to reach 0.1% deformation when exposed to a stress of 35 Ksi at 950° F.

2. [An alloy] *A product* as defined in claim 1 in which the silicon content is within the range of 0.08 to 0.09% by weight.

3. [An alloy] *A product* as defined in claim 1 of a weight composition approximately 6% aluminum, 2% tin, 4% zirconium, 2% molybdenum, 0.08 to 0.09% silicon, balance titanium and unavoidable impurities.

4. A method of improving the creep properties of a titanium base alloy which otherwise consists by weight of about 5.5 to 6.5% aluminum, 1.7 to 2.3% tin, 0.7 to 5.0% zirconium, 0.7 to 3.0% molybdenum, balance titanium and unavoidable impurities, and which has a residual silicon content of about 0.02 to 0.03%, said method comprising adding silicon to said alloy in an amount to produce a silicon content therein of at least 0.04% but less than 0.10% including the residual, *alpha-beta working said alloy to produce an alpha-beta worked structure* whereby the alloy attains sufficient creep strength that specimens thereof require a minimum time of 35 hours to reach 0.1% deformation when exposed to a stress of 35 Ksi at 950° F., yet retain sufficient notch toughness to have a minimum Charpy V-notch impact energy of 10 ft.-lbs. *at −40° F.*

5. A method as defined in claim 4 in which silicon is added to the alloy in an amount to produce a silicon content therein of 0.08 to 0.09%.

6. A method as defined in claim 4 in which the alloy otherwise consists by weight of approximately 6% aluminum, 2% tin, 4% zirconium, 2% molybdenum, balance titanium and unavoidable impurities.

* * * * *